US008923664B2

(12) United States Patent
Mekis et al.

(10) Patent No.: US 8,923,664 B2
(45) Date of Patent: Dec. 30, 2014

(54) METHOD AND SYSTEM FOR MULTI-MODE INTEGRATED RECEIVERS

(75) Inventors: Attila Mekis, Carlsbad, CA (US); Gianlorenzo Masini, Carlsbad, CA (US)

(73) Assignee: Luxtera, Inc., Carlsbad, CA (US)

( * ) Notice: Subject to any disclaimer, the term of this patent is extended or adjusted under 35 U.S.C. 154(b) by 691 days.

(21) Appl. No.: 13/156,990

(22) Filed: Jun. 9, 2011

(65) Prior Publication Data

US 2011/0305416 A1      Dec. 15, 2011

Related U.S. Application Data

(60) Provisional application No. 61/397,739, filed on Jun. 15, 2010.

(51) Int. Cl.
| | |
|---|---|
| *G02B 6/12* | (2006.01) |
| *G02B 6/42* | (2006.01) |
| *G02B 6/34* | (2006.01) |
| *G02B 6/00* | (2006.01) |
| *G02B 6/30* | (2006.01) |
| *G02B 6/43* | (2006.01) |
| *G02B 6/38* | (2006.01) |

(52) U.S. Cl.
CPC ............ *G02B 6/4239* (2013.01); *G02B 6/3897* (2013.01); *G02B 6/43* (2013.01)
USPC ................... 385/14; 385/28; 385/37; 385/49; 385/50; 385/12; 385/88; 385/132

(58) Field of Classification Search
CPC .............. G02B 6/14; G02B 6/30; G02B 6/43; G02B 6/122; G02B 6/12004
USPC ............. 385/14, 27–28, 39, 50, 52, 129–132, 385/12, 31, 49, 88, 91
See application file for complete search history.

(56) References Cited

U.S. PATENT DOCUMENTS

2005/0111777 A1*   5/2005   Stenger et al. ................... 385/14
2008/0002928 A1*   1/2008   Li ................................... 385/14

* cited by examiner

*Primary Examiner* — Akm Enayet Ullah
*Assistant Examiner* — Michael Mooney
(74) *Attorney, Agent, or Firm* — McAndrews, Held & Malloy

(57) ABSTRACT

A method and system for multi-mode integrated receivers are disclosed and may include receiving an optical signal from an optical fiber coupled to a chip comprising a photonic circuit. The photonic circuit may comprise an optical coupler, one or more multi-mode optical waveguides, and a detector. The received optical signal may be coupled to a plurality of optical modes in the one or more multi-mode optical waveguides, which are communicated to a detector to generate an electrical signal from the communicated modes. The optical coupler may comprise a grating coupler. The chip may comprise a CMOS chip, and the optical fiber may comprise a single-mode or a multi-mode fiber. The detector may comprise a germanium or silicon-germanium photodiode, and/or a waveguide detector. The optical fiber may be coupled to a top surface of the chip and the multi-mode optical waveguides may comprise rib waveguides.

20 Claims, 8 Drawing Sheets

METHOD AND SYSTEM FOR MULTI-MODE INTEGRATED RECEIVERS

CROSS-REFERENCE TO RELATED APPLICATIONS/INCORPORATION BY REFERENCE

This application makes reference to and claims priority to U.S. Provisional Application Ser. No. 61/397,739 filed on Jun. 11, 2010, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to signal processing. More specifically, certain embodiments of the invention relate to a method and system for multi-mode integrated receivers.

BACKGROUND OF THE INVENTION

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Optical communication systems have been widely adopted for applications ranging from internet backbone, local area networks, data centers, supercomputing, to high-definition video. Due to superior bandwidth and low loss, optical fibers are the medium of choice for transporting high-speed binary data.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for multi-mode integrated receivers, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for multi-mode integrated receivers. Exemplary aspects of the invention may comprise receiving an optical signal from an optical fiber coupled to a chip comprising a photonic circuit. The photonic circuit may comprise an optical coupler, one or more multi-mode optical waveguides, and a detector. The received optical signal may be coupled to a plurality of optical modes in the one or more multi-mode optical waveguides, which may be communicated to a detector to generate an electrical signal from the communicated modes. The optical coupler may comprise, for example, a grating coupler. The chip may comprise a CMOS chip, and the optical fiber may comprise a single-mode or a multi-mode fiber. The detector may comprise, for example, a germanium or silicon-germanium photodiode, and/or a waveguide detector. The optical fiber may be coupled to a top surface of the chip and the multi-mode optical waveguides may comprise rib waveguides, for example.

Figure 1A:
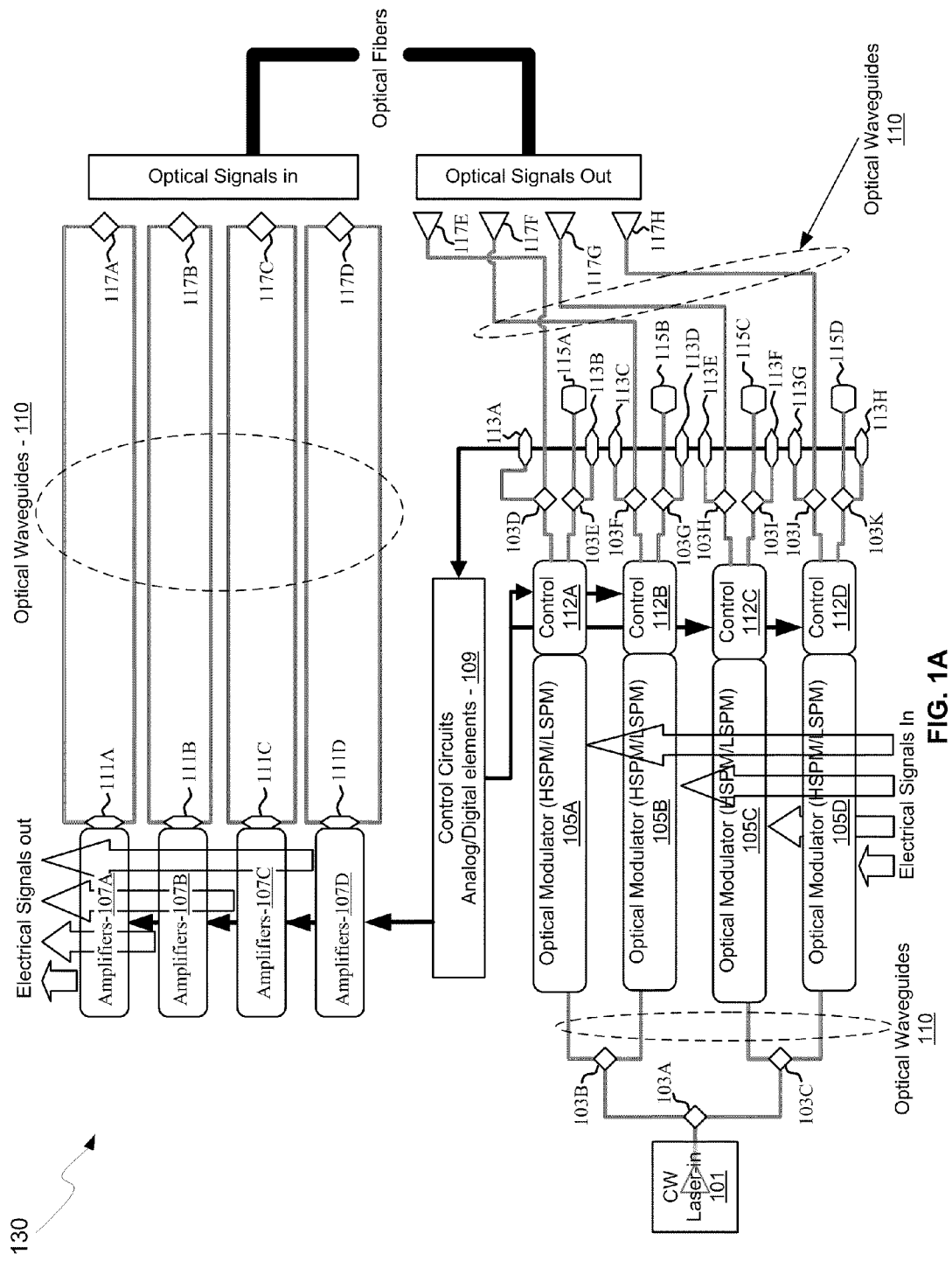
FIG. 1A is a block diagram of a photonically enabled CMOS chip comprising multi-mode integrated receivers, in accordance with an embodiment of the invention.

FIG. 1A is a block diagram of a photonically enabled CMOS chip comprising multi-mode integrated receivers, in accordance with an embodiment of the invention. Referring to FIG. 1A, there is shown optoelectronic devices on a CMOS chip 130 comprising optical modulators 105A-105D, photodiodes 111A-111D, monitor photodiodes 113A-113H, and optical devices comprising taps 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

Optical signals are communicated between optical and optoelectronic devices via optical waveguides 110 fabricated in the CMOS chip 130. Single-mode waveguides are typically used in photonic integrated circuits because single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. In an exemplary embodiment of the invention, the optical waveguides 110 may comprise multi-mode waveguide waveguides that may be utilized to communicate optical signals in the chip 130.

The optical modulators 105A-105D comprise Mach-Zehnder or ring modulators, for example, and enable the modulation of the CW laser input signal. The optical modulators 105A-105D comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

The phase modulators may have a dual role: to compensate for the passive biasing of the MZI and to apply the additional phase modulation used to modulate the light intensity at the output port of the MZI according to a data stream. The former phase tuning and the latter phase modulation may be applied by separate, specialized devices, since the former is a low speed, slowly varying contribution, while the latter is typically a high speed signal. These devices are then respectively referred to as the LSPM and the HSPM. Examples for LSPM are thermal phase modulators (TPM), where a waveguide portion is locally heated up to modify the index of refraction of its constituting materials, or forward biased PIN junctions (PINPM) where current injection into the PIN junction modifies the carrier density, and thus the index of refraction of the semiconductor material. An example of an HSPM is a reversed biased PIN junction, where the index of refraction is also modulated via the carrier density, but which allows much faster operation, albeit at a lower phase modulation efficiency per waveguide length.

The outputs of the modulators 105A-105D may be optically coupled via the waveguides 110 to the grating couplers 117E-117H. The taps 103D-103K comprise four-port optical couplers, for example, and are utilized to sample the optical signals generated by the optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D may be utilized to couple light received from optical fibers into the CMOS chip 130, and the grating couplers 117E-117H may be utilized to couple light from the CMOS chip 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the CMOS chip 130 to optimize coupling efficiency. In an embodiment of the invention, the optical fibers may comprise single-mode fiber (SMF) and/or polarization-maintaining fiber (PMF).

In another exemplary embodiment, optical signals may be communicated directly into the surface of the CMOS chip 130 without optical fibers by directing a light source on an optical coupling device in the chip, such as the light source interface 135 and/or the optical fiber interface 139. This may be accomplished with directed laser sources and/or optical sources on another chip flip-chip bonded to the CMOS chip 130.

The photodiodes 111A-111D may convert optical signals received from the grating couplers 117A-117D into electrical signals that are communicated to the amplifiers 107A-107D for processing. In another embodiment of the invention, the photodiodes 111A-111D may comprise high-speed heterojunction phototransistors, for example, and may comprise germanium (Ge) in the collector and base regions for absorption in the 1.3-1.6 µm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the CMOS chip 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an embodiment of the invention, the control sections 112A-112D may include sink and/or source driver electronics that may enable a bidirectional link utilizing a single laser.

In operation, the CMOS chip 130 may be operable to transmit and/or receive and process optical signals. The grating couplers 117A-117D may be operable to receive optical signals from optical fibers coupled to the chip 130 and may convert the optical mode of the fiber into the much smaller mode of a Si waveguide fabricated on the CMOS SOI wafer. The grating couplers 117A-117D may comprise a single-polarization or a polarization-splitting type: in the first case, only a specific polarization is coupled to a single Si waveguide, while in the second case, two orthogonal polarizations are split into two output waveguides.

Optical transceivers comprise a transmitter, a receiver, and one or more optical fibers connecting the two. The fibers in many traditional transceivers have large cores and are multi-mode to allow the use of vertical surface-emitting lasers (VCSELs) on the transmitter side. The drawback of employing multi-mode fibers for high-speed signal transmission is that modal dispersion significantly hampers the reach of the transceiver.

Transceivers that utilize single-mode fibers may overcome issues with multi-mode fibers since only a single mode is guided in the fiber in the wavelength range of interest. The light source on the transmitter side may be an edge-emitting laser that is compatible with this fiber type. Surface-illuminated detectors may be used in the receiver, but as the data rate increases, the capacitance of the surface-illuminated detector becomes a limiting factor. In contrast, waveguide photodetectors may have capacitances in the femto-Farad range and thus enabling data transmission rates well beyond 10 Gb/s.

Waveguide photodetectors may be incorporated in integrated optics platforms, where several components are integrated together on a single receiver chip, as illustrated in FIG. 1A. In this platform, light couplers, such as the optical couplers 117A-117D, couple the optical signal from the fiber into optical waveguides 110. The optical signal subsequently enters the waveguide detectors 111A-111D, where it is converted to an electrical signal. In some embodiments, the coupler may comprise a grating coupler, in which case the fiber is oriented in a near normal configuration to the chip 130 surface.

In instances where the fiber medium carries the signal in a single optical mode, the receiver subsystem on the chip, comprising the light coupler, the waveguide, and the waveguide detector, may be designed to support a single mode. Because the single-mode fiber mode has two polarization states, the term "single-mode waveguide" is used both for waveguides that support a single mode for each of the two polarizations (TE and TM) or for waveguides that only support one mode whose polarization is TE, with the electric field parallel to the substrate.

The single-mode waveguide architecture on the receiver chip may drive the design of the couplers and the detectors. In such a receiver subsystem, both components are designed to couple only to the fundamental mode of the single-mode waveguide. The transmission efficiency of the receiver subsystem is then determined by the coupling efficiency of the coupler to the fundamental waveguide mode and the coupling efficiency of the fundamental waveguide mode to the detector.

The efficiency of the receiver subsystem may be increased by utilizing several optical modes of the waveguides to transmit the light signal from the couplers to the detectors. The modal dispersion that may limit the transmission in the fiber may be less of a concern since the on-chip distances are normally much shorter than distances covered by the fibers.

Figure 1B:
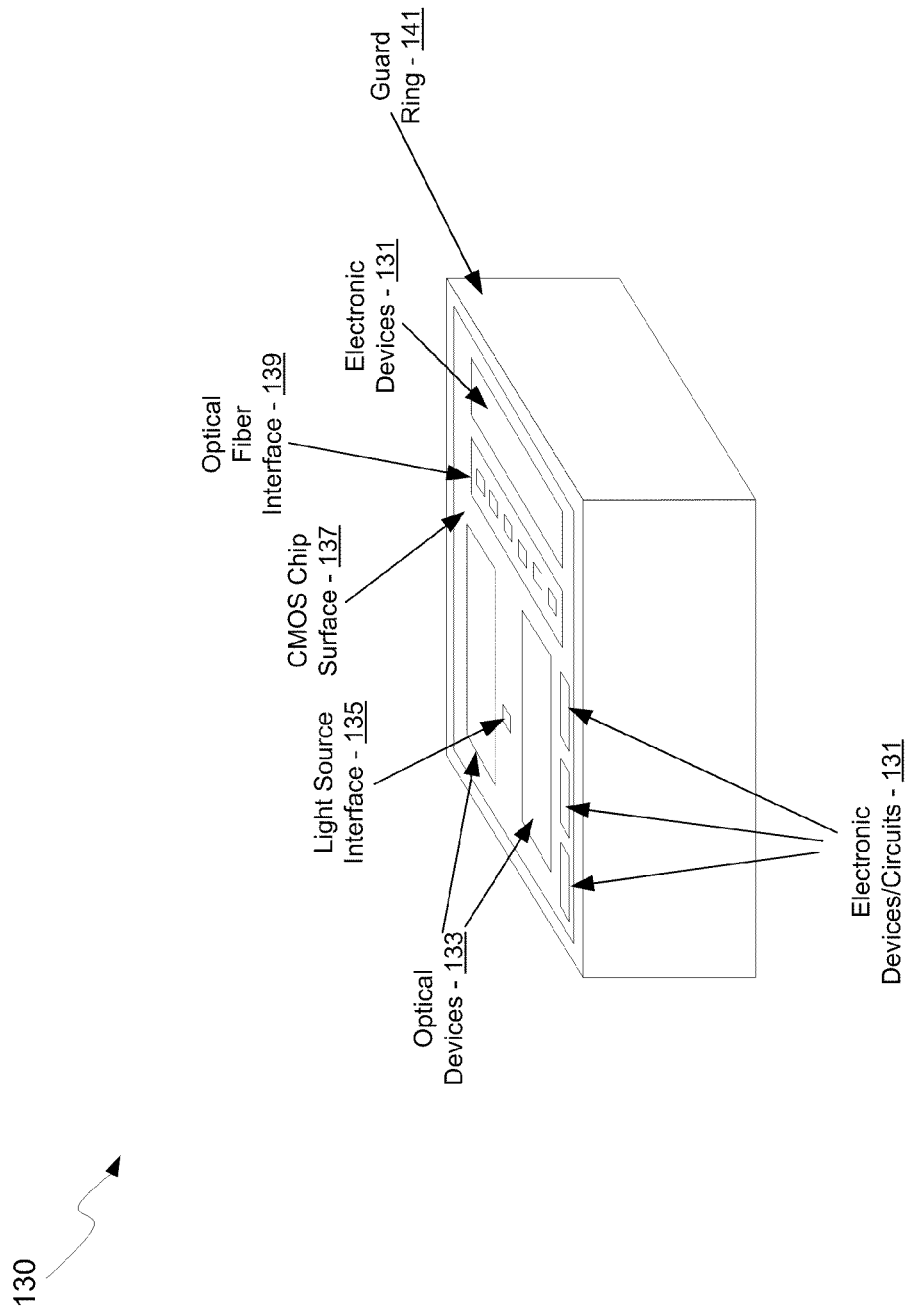
FIG. 1B is a diagram illustrating an exemplary CMOS chip, in accordance with an embodiment of the invention.

FIG. 1B is a diagram illustrating an exemplary CMOS chip, in accordance with an embodiment of the invention. Referring to FIG. 1B, there is shown the CMOS chip 130 comprising electronic devices/circuits 131, optical and optoelectronic devices 133, a light source interface 135, CMOS chip front surface 137, an optical fiber interface 139, and CMOS guard ring 141.

The light source interface 135 and the optical fiber interface 139 comprise grating couplers, for example, that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the taps 103A-103K, optical terminations 115A-115D, grating couplers 117A-117H, optical modulators 105A-105D, high-speed homojunction and/or heterojunction photodiodes 111A-111D, and monitor photodiodes 113A-113H.

In an embodiment of the invention, the efficiency of receiver subsystems on the CMOS chip 130 may be increased by utilizing several optical modes of the waveguides in the chip 130 to transmit the light signal from couplers to detectors. The modal dispersion that may limit the transmission in the fiber may be less of a concern in this instance since the on-chip distances are normally much shorter than distances covered by the fibers.

Figure 1C:
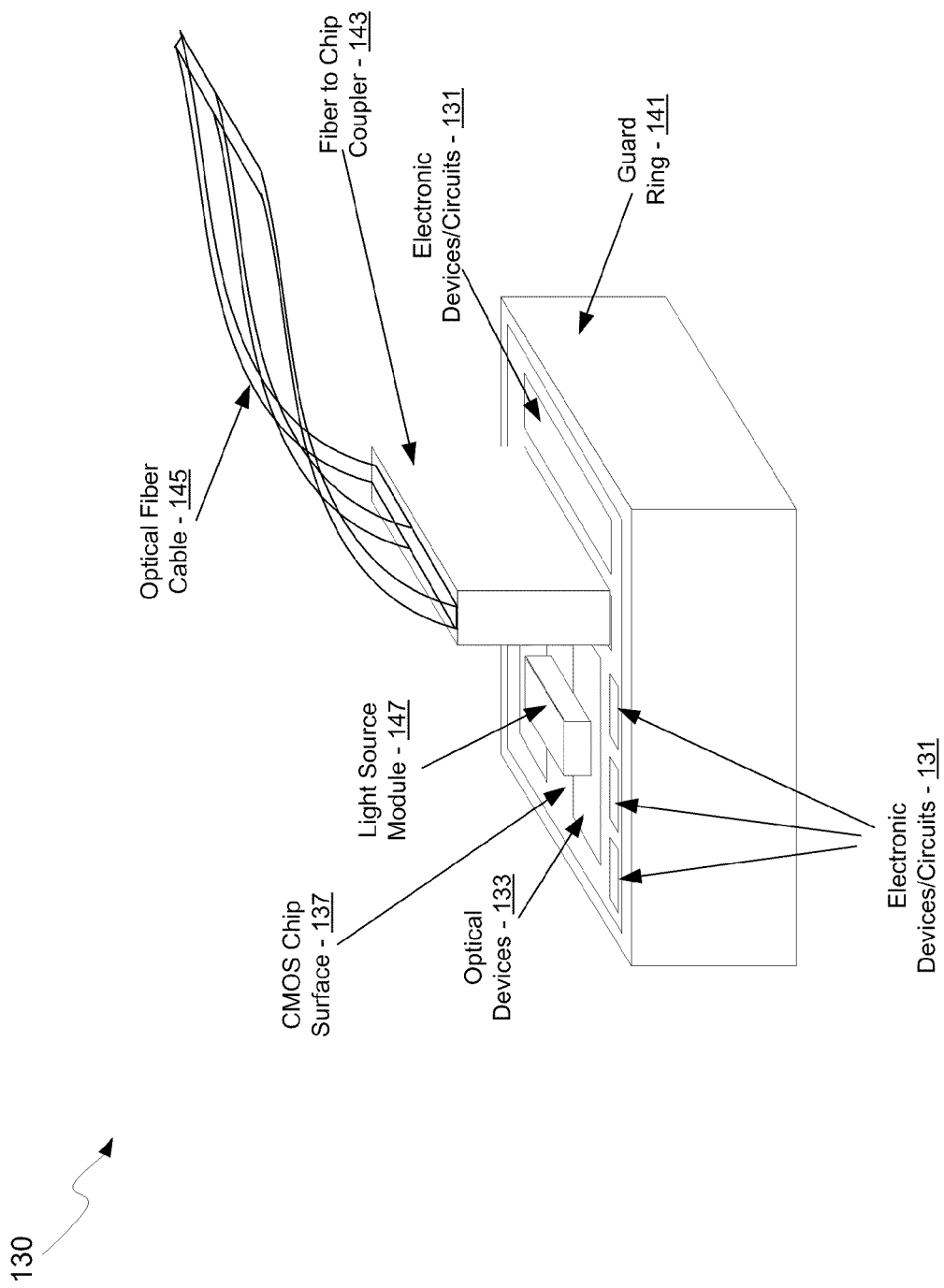
FIG. 1C is a diagram illustrating an exemplary CMOS chip coupled to an optical fiber cable, in accordance with an embodiment of the invention.

FIG. 1C is a diagram illustrating an exemplary CMOS chip coupled to an optical fiber cable, in accordance with an embodiment of the invention. Referring to FIG. 1C, there is shown the CMOS chip 130 comprising the CMOS chip surface 137, and the CMOS guard ring 141. There is also shown a fiber-to-chip coupler 143, an optical fiber cable 145, and an optical source assembly 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an embodiment of the invention, the optical fiber cable may be affixed, via epoxy for example, to the CMOS chip surface 137. The fiber chip coupler 143 enables the physical coupling of the optical fiber cable 145 to the CMOS chip 130.

In an embodiment of the invention, the efficiency of receiver subsystems on the CMOS chip 130 may be increased by utilizing several optical modes of the waveguides in the chip 130 to transmit the light signal from couplers to detectors. The modal dispersion that may limit the transmission in the fiber may be less of a concern in this instance since the on-chip distances are normally much shorter than distances covered by the fibers.

Figure 2:
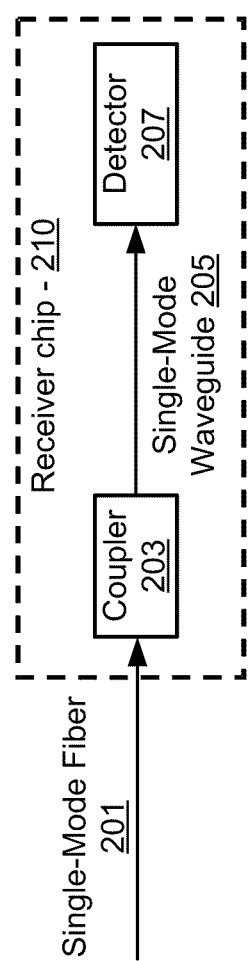
FIG. 2 is a block diagram of an exemplary single-mode waveguide receiver subsystem, in accordance with an embodiment of the invention.

FIG. 2 is a block diagram of an exemplary single-mode waveguide receiver subsystem, in accordance with an embodiment of the invention. Referring to FIG. 2, there is shown a single-mode fiber 201 and a receiver chip 210 comprising a coupler 203, a single-mode waveguide 205 and a detector 207.

The coupler 203 may comprise a grating coupler, for example, and may be operable to receive an optical signal from the single-mode fiber 201, and couple the received optical signal into the single-mode waveguide 205.

The detector 207 may comprise a photodetector, such as a germanium photodiode, for example, integrated in the receiver chip 210, and may be operable to convert a received optical signal into an electrical signal. Photodetectors may be fabricated from different materials to enable the detection of different wavelengths of light.

In operation, in accordance with an exemplary embodiment of the invention, an optical signal is communicated by the single-mode fiber 201 and into the coupler 203 in the receiver chip 210. The coupler couples optical modes into the single-mode waveguide 205. As described with respect to FIG. 1A, a single-mode waveguide architecture on the receiver chip may drive the design of the couplers and the detectors. In such a receiver subsystem, both components may be designed to couple only to the fundamental mode of the single-mode waveguide. The transmission efficiency of the receiver subsystem is then determined by the coupling efficiency of the coupler to the fundamental waveguide mode and the coupling efficiency of the fundamental waveguide mode to the detector.

Figure 3:
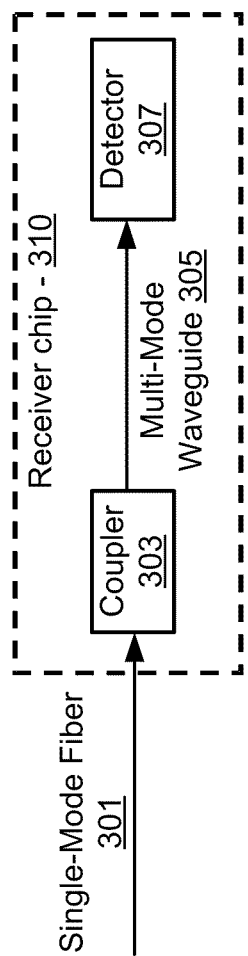
FIG. 3 is a block diagram of an exemplary multi-mode waveguide receiver subsystem, in accordance with an embodiment of the invention.

FIG. 3 is a block diagram of an exemplary multi-mode waveguide receiver subsystem, in accordance with an embodiment of the invention. Referring to FIG. 3, there is shown a single-mode fiber 301 and a receiver chip 310 comprising a coupler 303, a multi-mode waveguide 305 and a detector 307. The receiver chip 310 may be substantially similar to the chip 130 described with respect to FIGS. 1A-1C.

The coupler 303 may comprise a grating coupler, for example, and may be operable to receive an optical signal from the single-mode fiber 301, and couple the received optical signal into the multi-mode waveguide 305.

The detector 307 may comprise a photodetector, such as a germanium or silicon-germanium photodiode, for example, integrated in the receiver chip 310, and may be operable to convert a received optical signal into an electrical signal. Photodetectors may also be fabricated from different materials to enable the detection of different wavelengths of light. In an exemplary embodiment, the detector 307 may comprise a waveguide detector to enable efficient detection of optical signals from the waveguide 305.

In operation, in accordance with an exemplary embodiment of the invention, the coupler 303 redirects the optical signal incident on the chip 310 into the multi-mode waveguide 305. Since the waveguide 305 is multi-mode, the grating coupler 303 may be designed to efficiently couple not only to the fundamental mode, but also to the higher order modes in the waveguide 304. The grating periodicity, width, and/or spacing may be configured to achieve phase matching between the fiber mode and the waveguide modes, thereby apodizing the grating along the direction of light propagation to distribute the incident light into several guided modes.

The detector 307 may comprise a doped and/or undoped germanium layer deposited on a partially etched silicon waveguide, for example. As modes propagate into the detector 307, the absorbed photons may generate a photocurrent, which provides an electrical output signal. A germanium photodetector may be designed to absorb efficiently the optical power in several guided modes in the multi-mode waveguide 305. To increase the efficiency of absorption of multiple waveguide modes in the germanium, a waveguide taper may be used to transform the modes of the waveguide 305 before they enter the detector 307.

Figure 4:
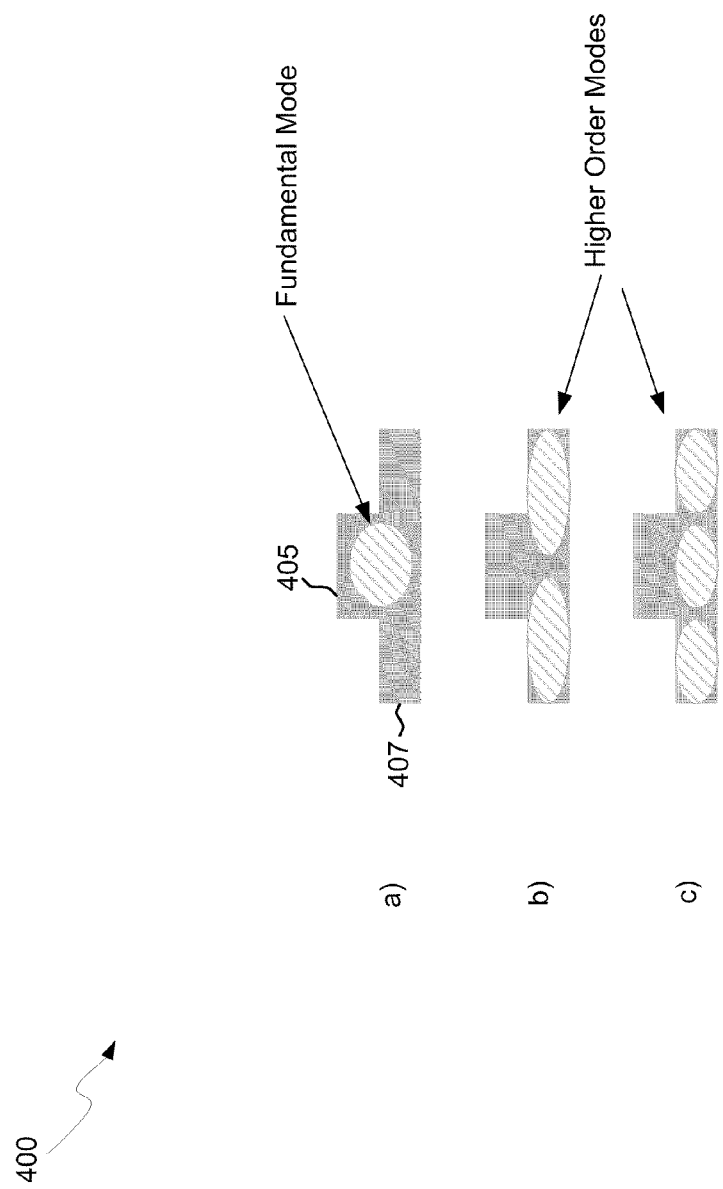
FIG. 4 is a block diagram of exemplary optical modes in rib optical waveguides, in accordance with an embodiment of the invention.

FIG. 4 is a block diagram of exemplary optical modes in rib optical waveguides, in accordance with an embodiment of the invention. Referring to FIG. 4, there is shown a rib waveguide 400 comprising a rib 405 and a slab 407.

The optical modes supported by the rib waveguide 400 may depend on the dimensions and dielectric constant of the material used to fabricate the structure. FIG. 4 *a*) illustrates a fundamental mode that may propagate through the rib waveguide 400, whereas FIGS. 4 *b*) and *c*) illustrate possible higher order modes that may propagate.

The rib 405 may be created by a shallow etch process that partially cuts through the silicon thin film layer from the top. Subsequently, by etching the silicon slab 407 on both sides at a few microns from the rib 405, a multi-mode waveguide may be created. Both the rib 405 and the slab 407 may have arbitrary widths. The intensity of the fundamental mode of the waveguide 400 may be focused mainly in the rib 405, and the intensities of the higher order modes may be focused both inside the slab 407 and the rib 405.

The efficiency of a receiver subsystem may be increased by utilizing several optical modes of the waveguide 400 to transmit the light signal from couplers to detectors, as opposed to only a single mode. The modal dispersion that may limit the transmission in the fiber may be less of a concern in this instance since the on-chip distances are normally much shorter than distances covered by the fibers.

Figure 5:
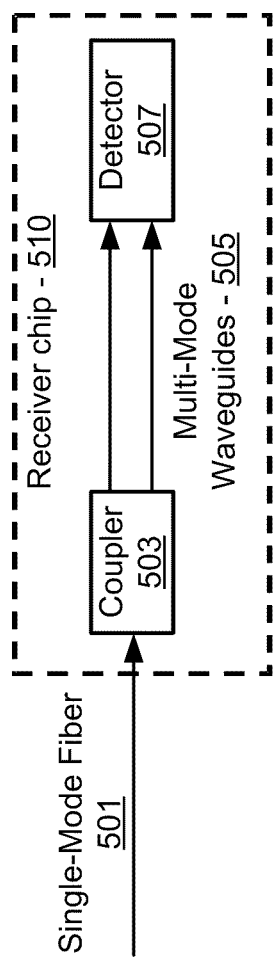
FIG. 5 is a block diagram of an exemplary multi-mode receiver with polarization diversity, in accordance with an embodiment of the invention.

FIG. 5 is a block diagram of an exemplary multi-mode receiver with polarization diversity, in accordance with an embodiment of the invention. Referring to FIG. 5, there is shown a single-mode fiber 501 and a receiver chip 510 comprising a coupler 503, multi-mode waveguides 505 and a detector 507. The receiver chip 510 may be substantially similar to the chip 310 described with respect to FIG. 3, but with a plurality of multi-mode fibers 505 and a coupler that may be operable to split received optical signals into two waveguides.

If the polarization of the light signal propagating in the fiber 501 is unknown at the receiver chip 510, a polarization-splitting grating coupler 503 may be used to split the light signal into two waveguides of the multi-mode waveguides 505, where each individual waveguide may receive optical power according to the polarization of the incident light signal. At the detector 507, the signals may be recombined, for instance, by using the two input ports of the waveguide detector 507. The polarization-splitting grating coupler 503 may also be designed to couple light efficiently into several modes of each of the multi-mode waveguides 505.

Figure 6:
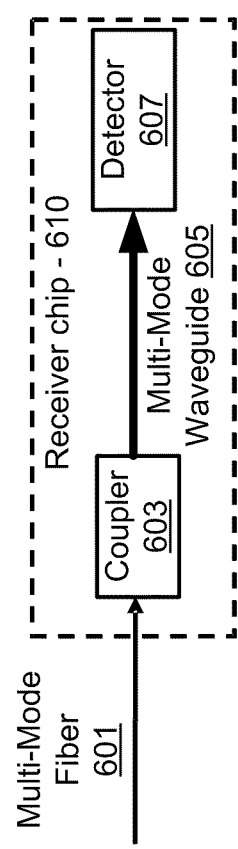
FIG. 6 is a block diagram of an exemplary multi-mode receiver with multi-mode fiber input, in accordance with an embodiment of the invention.

FIG. 6 is a block diagram of an exemplary multi-mode receiver with multi-mode fiber input, in accordance with an embodiment of the invention. Referring to FIG. 6, there is shown a multi-mode fiber 601 and a receiver chip 610 comprising a coupler 603, a multi-mode waveguide 605, and a detector 607. The receiver chip 610 may be substantially similar to the receiver chip 310 described with respect to FIG. 3, but with a multi-mode input fiber 601 and a coupler 603 that may be operable to couple optical power from a plurality of modes received from the multi-mode fiber 601 to a plurality of modes in the multi-mode waveguide 605.

In another embodiment of the invention, the receiver chip 601 may enable polarization diversity with respect to the optical signals received from the multi-mode fiber 601, similar to the polarization diversity described with respect to FIG. 5, where the polarization of the received optical signal is unknown. In another exemplary embodiment, the detector 607 may comprise a laterally illuminated detector as opposed to a waveguide detector.

In an embodiment of the invention, a method and system are disclosed for receiving an optical signal from an optical fiber coupled to a chip comprising a photonic circuit. The photonic circuit may comprise an optical coupler, one or more multi-mode optical waveguides, and a detector. The received optical signal may be coupled to a plurality of optical modes in the one or more multi-mode optical waveguides, which may be communicated to a detector to generate an electrical signal from the communicated modes. The optical coupler may comprise a grating coupler, for example. The chip may comprise a CMOS chip, for example, and the optical fiber may comprise a single-mode or a multi-mode fiber. The detector may comprise, for example, a germanium or silicon-germanium photodiode, and/or a waveguide detector. The optical fiber may be coupled to a top surface of the chip and the multi-mode optical waveguides may comprise rib waveguides, for example.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing optical signals, the method comprising:
   in a chip comprising a photonic circuit, said photonic circuit comprising an optical coupler, one or more multi-mode optical waveguides, and a detector:
   coupling an optical signal from an optical fiber coupled to said chip
   to a plurality of optical modes in said one or more multi-mode optical waveguides utilizing said optical coupler;
   communicating said plurality of optical modes to a detector utilizing said one or more multi-mode optical waveguides; and
   generating an electrical signal from said communicated plurality of optical modes.

2. The method according to claim 1, wherein said optical coupler comprises a grating coupler.

3. The method according to claim 1, wherein said chip comprises a CMOS chip.

4. The method according to claim 1, wherein said optical fiber comprises a single-mode fiber.

5. The method according to claim 1, wherein said optical fiber is a multi-mode fiber.

6. The method according to claim 1, wherein said detector comprises a germanium photodiode.

7. The method according to claim 1, wherein said detector comprises a silicon-germanium photodiode.

8. The method according to claim 1, wherein said optical detector comprises a waveguide detector.

9. The method according to claim 1, wherein said optical fiber is coupled to a top surface of said chip.

10. The method according to claim 1, wherein said one or more multi-mode optical waveguides comprise rib waveguides.

11. A system for processing optical signals, the system comprising:
- a chip comprising a photonic circuit, said photonic circuit comprising an optical coupler, one or more multi-mode optical waveguides, and a detector, said chip being operable to:
  - couple an optical signal from an optical fiber coupled to said chip
  - to a plurality of optical modes in said one or more multi-mode optical waveguides utilizing said optical coupler;
  - communicate said plurality of optical modes to a detector utilizing said one or more multi-mode optical waveguides; and
  - generate an electrical signal from said communicated plurality of optical modes.

12. The system according to claim 11, wherein said optical coupler comprises a grating coupler.

13. The system according to claim 11, wherein said chip comprises a CMOS chip.

14. The system according to claim 11, wherein said optical fiber comprises a single-mode fiber.

15. The system according to claim 11, wherein said optical fiber is a multi-mode fiber.

16. The system according to claim 11, wherein said detector comprises a germanium photodiode.

17. The system according to claim 11, wherein said detector comprises a silicon-germanium photodiode.

18. The system according to claim 11, wherein said optical detector comprises a waveguide detector.

19. The system according to claim 11, wherein said optical fiber is coupled to a top surface of said chip.

20. The system according to claim 11, wherein said one or more multi-mode optical waveguides comprise rib waveguides.

* * * * *